United States Patent [19]

Porter, Jr. et al.

[11] Patent Number: 5,314,144
[45] Date of Patent: May 24, 1994

[54] THERMALLY COMPENSATING INSERT FASTENER

[75] Inventors: Frank K. Porter, Jr., Billerica; Eliot D. Nelson, Acton; Daniel R. Arimento, Westford; Terence J. Reidy, Chelmsford, all of Mass.

[73] Assignee: Raytheon Company, Lexington, Mass.

[21] Appl. No.: 810,755

[22] Filed: Dec. 18, 1991

[51] Int. Cl.⁵ .............................................. B64C 1/12
[52] U.S. Cl. .................................. 244/132; 285/109; 244/119
[58] Field of Search ...................... 244/132, 123, 129.1, 244/117 R, 119; 411/111, 112, 113, 108, 105, 432, 965, 971, 999; 403/408.1, 356, 355; 285/370, 109

[56] References Cited

U.S. PATENT DOCUMENTS

| | | | |
|---|---|---|---|
| 782,482 | 2/1905 | Brockett | 285/109 |
| 2,405,643 | 8/1946 | Crot | 244/119 |
| 2,857,950 | 10/1958 | Tingley | 244/132 |
| 3,434,262 | 3/1969 | Lawrence | 244/132 |
| 4,964,594 | 10/1990 | Webb | 244/132 |
| 5,014,934 | 5/1991 | McClaflin | 244/132 |

FOREIGN PATENT DOCUMENTS 960120  12/1974  Canada ...................... 411/112

*Primary Examiner*—Michael S. Huppert
*Assistant Examiner*—Anne E. Bidwell
*Attorney, Agent, or Firm*—Donald F. Mofford; Richard M. Sharkansky

[57] ABSTRACT

A fastener assembly is shown including a cylindrical support structure with a bore provided partially therein, the bore having a wall surface with a slot, and a bushing, disposed within the bore of the cylindrical support structure, having an end and an outer surface with a slot therein. The bushing further includes a bore with a first portion having a first diameter and a second portion having a second different diameter, the bushing also having a pair of tangs extending from the end. The fastener assembly further includes a nut, partially disposed within the second portion of the bore of the bushing, the nut having an outer surface with a pair of lugs disposed on the outer surface to engage the pair of tangs of the bushing and a pin disposed juxtapositional the slot of the wall surface of the cylindrical support structure and juxtapositional the slot of the bushing. The fastener assembly still further includes a pin disposed juxtapositional the slot of the wall surface of the cylindrical support structure and juxtapositional the slot of the bushing. With such an arrangement, a fastener assembly is provided in which a forward shell section and an aft shell can be interconnected independent of the cylindrical support structure, thus maintaining circularity of airframe components and minimizing circular distortion.

15 Claims, 2 Drawing Sheets

THERMALLY COMPENSATING INSERT FASTENER

This invention was made with Government support under Contract No. F08635-88-C-0116 awarded by the Department of the Air Force. The Government has certain rights in this invention.

BACKGROUND OF THE INVENTION

This invention pertains generally to fasteners and particularly to a thermally compensating insert fastener for interconnecting two sections of a missile.

It should be appreciated in an apparatus such as a missile it is often desirable to construct a missile in sections. Typically the missile includes a radome, a guidance section, a warhead section, a flight control section and a rocket motor section. In a missile, the guidance section can be pressurized to prevent high voltage arcing during operation at high altitudes. Numerous seals are employed to maintain guidance section pressure during passive captive carry flight and during active operational free flight. Loss of pressure during flight can cause the guidance section which houses a target seeker to operate incorrectly.

One known cause of loss of pressure in the guidance section during flight is from an improper seal at an interconnection of two sections of the missile. One type of interconnection for connecting a forward titanium shell with an aft titanium shell includes an inner titanium support structure which is mutually interconnected with the forward and aft titanium shells with a set of eleven fasteners. Each of the fasteners include an external countersunk screw and a "Keensert", which is an externally threaded bushing having an internally mounted nut, affixed within the internal support structure.

With such an arrangement, when the fasteners are tightened, deformation of the forward and aft shells will occur as the forward and aft shells are drawn toward the internal support structure. Since the inner diameter of the forward shell will not exactly match the outer diameter of the aft shell and the inner diameter of the aft shell will not exactly match the outer diameter of the internal support structure due to manufacturing tolerances, varying radial gaps will exist. As the fasteners are tightened, scalloping of the forward and aft shells will occur. Typically, visible measurable shell scalloping between fastener locations can be observed with the forward shell being the most deformed. The interconnection also includes two seals using butyl O-rings. One O-ring seals the forward shell to the support structure. The other O-ring seals the aft shell to the support structure. When the forward shell and the aft shell are interconnected with the support structure, the seals are uniformly compressed. As the fasteners are tightened, mechanical deformation is induced and the seals are no longer uniformly compressed. Cold temperatures inhibit the seal response to changes in compression which occur during rapid airframe heating. The latter can induce seal failure and pressure loss during flight.

SUMMARY OF THE INVENTION

With the foregoing background of this invention in mind, it is a primary object of this invention to provide a fastener assembly which minimizes airframe shell distortion and inner structure distortion of a missile.

Still another object of this invention is to provide a fastener assembly having an uniform seal compression during storage and, in flight environments, having an increase performance at varying temperatures The foregoing and other objects of this invention are met generally by a fastener assembly including a cylindrical support structure with a bore provided partially therein, the bore having a wall surface with a slot, and a bushing, disposed within the bore of the cylindrical support structure, having an end and an outer surface with a slot therein. The bushing further includes a bore with a first portion having a first diameter and a second portion having a second different diameter, the bushing also having a pair of tangs extending from the end. The fastener assembly further includes a nut, partially disposed within the second portion of the bore of the bushing, the nut having an outer surface with a pair of lugs disposed on the outer surface to engage the pair of tangs of the bushing and a pin disposed juxtapositional the slot of the wall surface of the cylindrical support structure and juxtapositional the slot of the bushing. The fastener assembly still further includes a pin disposed juxtapositional the slot of the wall surface of the cylindrical support structure and juxpositional the slot of the bushing. With such an arrangement, a fastener assembly is provided in which a forward shell section and an aft shell can be interconnected independent of the cylindrical support structure, thus maintaining circularity of airframe components and minimizing circular distortion. The forward and aft shell are rigidly attached to each other and not to the cylindrical support structure, so that aero heating of the forward and aft shells will not induce more distortion.

In accordance with a further aspect of the present invention, the bushing further includes an opposing end having a radially curved surface with a contour to match an inner surface of a missile shell when the missile shell is mated with the opposing end of the bushing. With such an arrangement, uniform compression is maintained between the opposing end of the bushing and the inner surface of the missile shell.

In accordance with a further aspect of the present invention, the cylindrical support structure of the fastener assembly further includes a first seal gland disposed forward of the bore of the cylindrical support structure and a second seal gland disposed aft of the bore of the cylindrical support structure. The fastener assembly further includes a first and a second methylphenol-silicone O-ring, the first O-ring disposed adjacent the first seal gland and the second O-ring disposed adjacent the second seal gland. With such an arrangement, the fastener assembly provides uniform O-ring compression and uniform O-ring compression is maintained during varying changes in temperature.

BRIEF DESCRIPTION OF THE DRAWINGS

For a more complete understanding of this invention, reference is now made to the following description of the accompanying drawings wherein.

DESCRIPTION OF THE PREFERRED EMBODIMENTS

Figure 1:
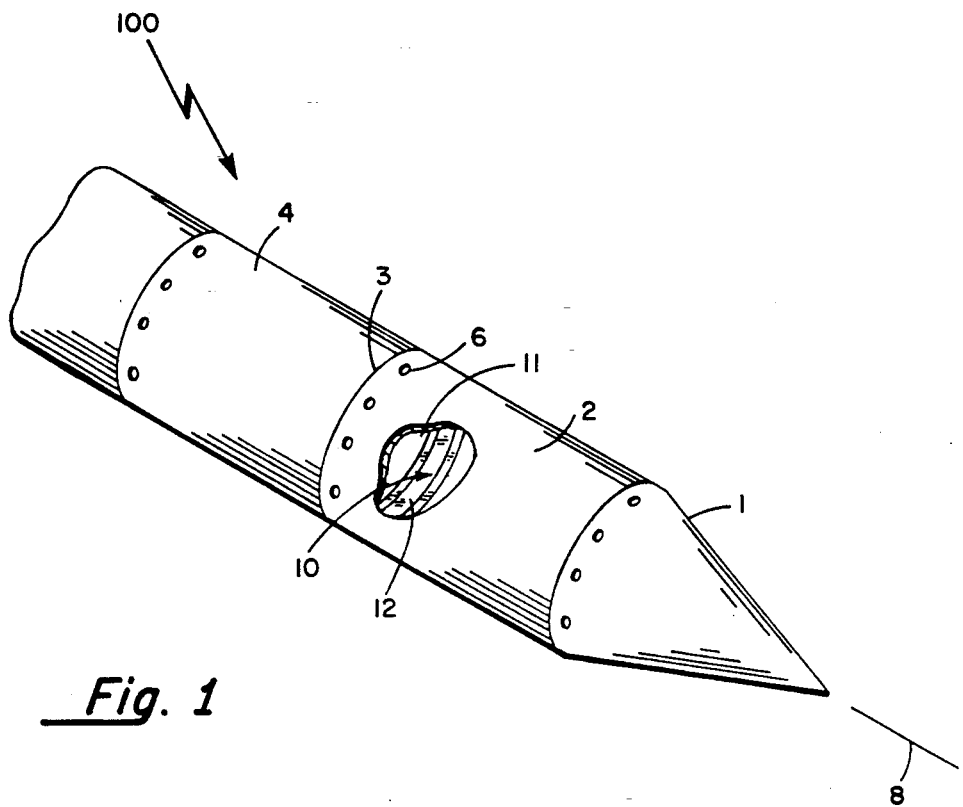
FIG. 1 is a sketch of a missile showing an exemplary interconnection according to the invention.

Referring now to FIG. 1, a missile 100 is shown to include a radome 1, a forward missile shell 2, and an aft missile shell 4. The forward missile shell 2 is connected to the aft missile shell 4 using fastener assembly 10. The fastener assembly 10 includes a cylindrical support structure 12 which is described further hereinafter. A plurality of screws, including screw 6, are mated with a corresponding plurality of bushings, (not shown) and nuts (not shown). The plurality of screws, here numbering eleven, are spaced circumferentially about the periphery of the missile as required and when tightened connect forward missile shell 2 with aft missile shell 4. With such an arrangement, an inner sealed missile compartment 11 is provided. Although not shown for sake of illustration, a missile seeker is disposed within the inner seal missile compartment 11 to provide the guidance section of the missile 100. The fastener assembly 10 when used with the plurality of screws, including screw 6, provides a technique for interconnecting forward missile 2 with aft missile shell 4 while maintaining minimal circular distortion about a missile center line 8. The inner seal missile compartment 11 is a sealed compartment which is pressurized requiring the interconnection 3 to be a pneumatically sealed interface. The fastener assembly 10 provides such an interface.

Figure 2:
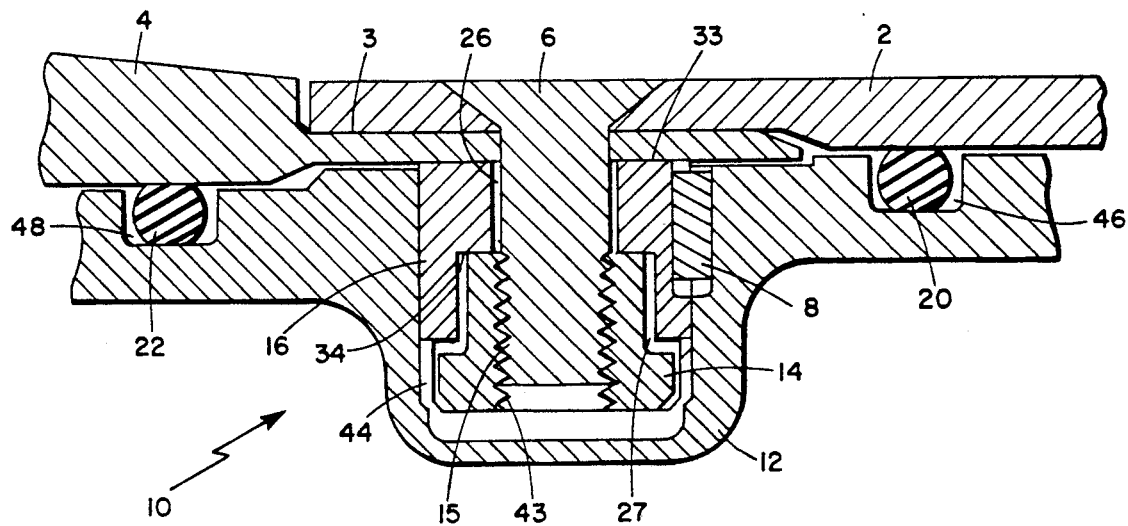
FIG. 2 is a cross-section of a portion of an exemplary interconnection of two sections of a missile.
Figure 3:
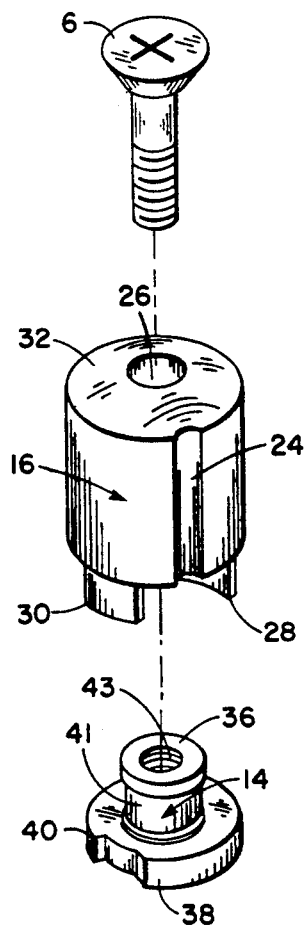
FIG. 3 is a sketch of one of the fasteners used to complete the interconnection shown in FIG. 1; an FIG. 4 is a sketch showing a portion of a cylindrical support structure according to the invention.
Figure 4:
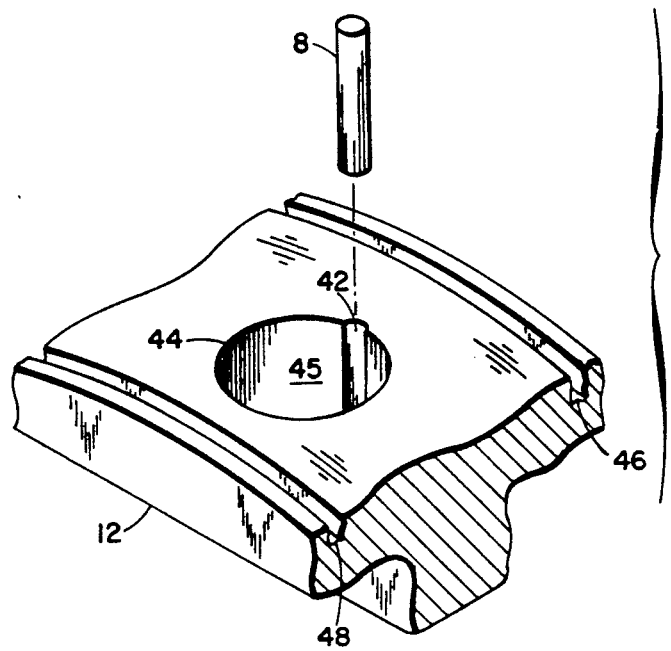

Referring now to FIGS. 2, 3, and 4, a portion of fastener assembly 10 is shown to include the cylindrical support structure 12, a bushing 16 and a nut 14. With the aft missile shell 4 disposed about a portion of the fastener assembly 10 and the forward missile shell 2 is disposed about a portion of aft missile 4 and a portion of the fastener assembly 10, the screw 6 is mated with the bushing 16 and the nut 14 to provide the interconnection 3. Here the forward missile shell 2 and the aft missile shell 4 is fabricated from titanium, as well as the cylindrical support structure 12.

The bushing 16, fabricated from stainless steel, includes a cylindrical shaped structure with a bore (not numbered) provided through the center of the structure. The bore includes a first portion 26 having a first diameter to accommodate the shaft of the screw 6 and a second portion 27 having a second different diameter to accommodate the nut 14. A first end 32 of the bushing 16 is disposed against an inner surface 33 of the aft missile shell 4. The first end 32 of the bushing 16 includes a radially curved surface with a contour to match the shape of the contour of the inner surface 33 of the aft missile shell 4. The latter provides uniform compression between the first end 32 of the bushing 16 and the inner surface 33 of the aft missile shell 4 when the screw 6 is tightened with the nut 14. A second opposing end includes a pair of tangs, including tang 28 and tang 30, extending from the second opposing end. A slot 24 is provided within the outer surface as shown.

The nut 14, here fabricated from stainless steel, includes an outer surface 41 with a diameter such that the nut 14 will fit into the second portion 27 of the bore within the bushing 16. A pair of lugs, including lug 38 and lug 40, extend from the outer surface 41 of nut 14, as shown, and engage tang 28 and tang 30 of the bushing 16 when the nut 14 is disposed within the bushing 16. The latter provides torsional coupling between the tangs 28 and 30 of the bushing 16 and the lugs 38 and 40 of the nut 14. A radial face surface 36 of the nut 14 rests adjacent a radial face surface 34 of the bushing 16 when the nut 14 is mated with the bushing 16. Threads 43 are provided within the nut 14 to mate with mating threads 15 of the screw 6.

The cylindrical support structure 12, here having a shape as shown, includes a plurality of bores, including a bore 44 and here numbering eleven, spaced circumferentially about the cylindrical support structure 12. The bore 44 is sized to accommodate the bushing 16 and the nut 14 such that the bushing 16 is constrained to a slip fit within the bore 44. The bore 44 is limited in depth and does not breach the inner sealed missile compartment 11 (FIG. 1). The bore 44 includes a wall surface 45 with a slot 42 provided therein. With the bushing 16 mounted within the bore 44 of the cylindrical support structure 12, the slot 24 of the bushing 16 is disposed adjacent the slot 42 within the bore 44 of the cylindrical support structure 12 and a pin 8 is disposed between the slots 24 and 42. With such an arrangement, the bushing 16 is prevented from rotating within the bore 44. Each one of the plurality of bores spaced circumferentially about the cylindrical support structure 12 are similar to the bore 44 with each bore accommodating a corresponding bushing similar to the bushing 16, a corresponding nut similar to the nut 14 and a corresponding pin similar to the pin 8. On either side of the plurality of bores, including bore 44, a seal gland, here seal gland 46 and seal gland 48 respectively, is provided circumferentially about the cylindrical support structure 12. Disposed within the seal glands 46 and 48 are a seal 20 and a seal 22, respectively. The seals 20 and 22 are a methyl-phenol-silicone O-ring and provide a proper seal over a varying temperature range. The seal 20 provides a proper seal between the cylindrical support structure 12 and the forward missile shell 2. The seal 22 provides a proper seal between the cylindrical support structure 12 and the aft missile shell 4.

With such an arrangement, a pneumatically sealed (pressurized) structural interconnection is provided. Since bushing 16 is freely slidable within the bore 44 of the cylindrical support structure 12, when the screw 6 is tightened with the nut 14, forward missile shell 12 is connected to aft missile shell 4 independently of cylindrical support structure 12. The latter provides a uniform peripheral squeeze of the seals 20 and 22 at changing environments and minimizes distortion of forward missile shell 2 and aft missile shell 4. Such an arrangement also provides unrestrained thermal growth of the forward missile shell 2 and the aft missile shell 4 during rapid temperature changes. The amount of thermal expansion for the cylindrical support structure 12 is different than the amount of thermal expansion of the forward missile shell 2 and the aft missile shell 4, since the cylindrical support structure 12 is exposed to less heat than the forward missile shell 2 and the aft missile shell 4. Since forward missile shell 2 and aft missile shell 4 are independent of the cylindrical support structure 12, unrestrained thermal growth of the forward missile shell 2 and the aft missile shell 4 can occur independent of the cylindrical support structure 12, thus reducing missile shell distortion.

Having described this invention, it will now be apparent that the number and disposition of various elements of the fastener assembly 10 may be changed without affecting this invention. It is felt, therefore, that this invention should not be restricted to its disclosed embodiment but rather should be limited only by the spirit and scope of the appended claims.

What is claimed is:

1. A fastener assembly comprising:
   (a) a cylindrical support structure with a bore provided partially therein, the bore having a wall surface with a slot;
   (b) a bushing, disposed within the bore of the cylindrical support structure, having an end and an outer surface with a slot therein, the bushing further having a bore with a first portion having a first diameter and a second portion having a second different diameter, the bushing further having a pair of tangs extending from the end;
   (c) a nut, partially disposed within the second portion of the bore of the bushing, having an outer surface with a pair of lugs disposed on the outer surface to engage the pair of tangs of the bushing; and
   (d) a pin disposed juxtapositional the slot of the wall surface of the cylindrical support structure and juxtapositional the slot of the bushing.

2. The fastener assembly as recited in claim 1 wherein the bushing further comprises an opposing end having a radially curved surface with a contour to match an inner surface of a missile shell when the missile shell is mated with the opposing end of the bushing.

3. The fastener assembly as recited in claim 2 wherein the cylindrical support structure further comprises a first seal gland disposed forward of the bore of the cylindrical support structure and a second seal gland disposed aft of the bore of the cylindrical support structure and the fastener assembly further comprises a first and a second O-ring, the first O-ring disposed adjacent the first seal gland and the second O-ring disposed adjacent the second seal gland.

4. The fastener assembly as recited in claim 3 wherein said cylindrical support structure is fabricated from titanium and said bushing and said nut are fabricated from stainless steel.

5. The fastener assembly as recited in claim 4 wherein said first and second O-rings are fabricated from methyl-phenol-silicone.

6. The fastener assembly as recited in claim 5 wherein the cylindrical support structure further includes a plurality of bores, each bore having a wall surface with a slot, and the fastener assembly further comprises:
   (a) a plurality of bushings, each bushing disposed within a corresponding bore of the cylindrical support structure, each bushing having an end and an outer surface with a slot therein, each bushing further having a bore with a first portion having a first diameter and a second portion having a second different diameter, each bushing further having a pair of tangs extending from the end;
   (b) a plurality of nuts, each nut partially disposed within the second portion of the bore of a corresponding bushing, each nut having an outer surface with a pair of lugs disposed on the outer surface to engage the pair of tangs of the corresponding bushing; and
   (c) a plurality of pins, each pin disposed juxtapositional the slot of the wall surface of a corresponding bore of the cylindrical support structure and juxtapositional the slot of a corresponding bushing.

7. The fastener assembly as recited in claim 6 wherein said plurality of bushings and said plurality of nuts are fabricated from stainless steel.

8. A fastener assembly for connecting two sections of a missile comprising:
   (a) a plurality of bushings, each bushing having a first end and a second end and an inner surface and an outer surface, the inner surface having a first portion with a first diameter and a second portion with a second different diameter and the outer surface having a slot therein, each bushing further having a pair of tangs extending from the first end;
   (b) a plurality of nuts, each nut having an inner surface and an outer surface, the inner surface having threads and the outer surface dimensioned to mount within the second portion of the inner surface of a corresponding bushing, each nut further including a pair of lugs disposed on the outer surface to engage the pair of tangs of the corresponding bushing when the nut is disposed within the bushing;
   (c) a cylindrical support structure with a plurality of bores, each bore provided partially therein and having a wall surface with a slot and dimensioned to accommodate a corresponding nut and bushing; and
   (d) a plurality of pins, each pin disposed juxtapositional the slot of the wall surface of a corresponding bore of the cylindrical support structure and juxtapositional the slot of the outer surface of a corresponding bushing.

9. The fastener assembly as recited in claim 8 wherein each one of the plurality of the bushings further comprises an opposing end having a radially curved surface with a contour to match an inner surface of a missile shell when the missile shell is mated with the opposing end of each one of the bushings.

10. The fastener assembly as recited in claim 9 wherein the cylindrical support structure further comprises a first seal gland disposed forward of the plurality of bores of the cylindrical support structure and a second seal gland disposed aft of the plurality of bores of the cylindrical support structure and the fastener assembly further comprises a first and a second O-ring, the first O-ring disposed adjacent the first seal gland and the second O-ring disposed adjacent the second seal gland.

11. The fastener assembly as recited in claim 10 wherein said cylindrical support structure is fabricated from titanium and said bushings and said nuts are fabricated from stainless steel.

12. The fastener assembly as recited in claim 11 wherein said first and second O-rings are fabricated from methyl-phenol-silicone.

13. A fastener assembly comprising:
   (a) a cylindrical support structure with a plurality of bores, each bore having a wall surface with a slot;
   (b) a plurality of bushings, each bushing disposed within a corresponding bore of the cylindrical support structure, each bushing having an end and an outer surface with a slot therein, each bushing further having a bore with a first portion having a first diameter and a second portion having a second different diameter, each bushing still further having a pair of tangs extending from the end;
   (c) a plurality of nuts, each nut partially disposed within the second portion of the bore of a corresponding bushing, each nut having an outer surface with a pair of lugs disposed on the outer surface to engage the pair of tangs of the corresponding bushing;
   (d) a plurality of pins, each pin disposed juxtapositional the slot of the wall surface of a corresponding bore of the cylindrical support structure and juxtapositional the slot of a corresponding bushing; and (e) wherein the cylindrical support structure further comprises a first seal gland disposed forward of the plurality of bores of the cylindrical support structure and a second seal gland disposed aft of the plurality of bores of the cylindrical support structure and the fastener assembly further comprises a first and a second O-ring, the first O-ring disposed adjacent the first seal gland and the second O-ring disposed adjacent the second seal gland.

14. The fastener assembly as recited in claim 13 wherein said first and second O-rings are fabricated from methyl-phenol-silicone.

15. The fastener assembly as recited in claim 13 wherein said plurality of bushings and said plurality of nuts are fabricated from titanium.

* * * * *